United States Patent
Reid et al.

(10) Patent No.: US 6,577,485 B2
(45) Date of Patent: Jun. 10, 2003

(54) ULTRA-WIDE INPUT RANGE POWER SUPPLY FOR CIRCUIT PROTECTION DEVICES

(75) Inventors: Paul A. Reid, Marion, IA (US); Steven M. Meehleder, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 47 days.

(21) Appl. No.: 09/976,706

(22) Filed: Oct. 12, 2001

(65) Prior Publication Data

US 2003/0072115 A1 Apr. 17, 2003

(51) Int. Cl.[7] .................................................. H02H 3/08
(52) U.S. Cl. ........................ 361/93.1; 361/93.3; 361/18
(58) Field of Search .............................. 363/49, 69, 70, 363/89; 323/901, 908; 361/18, 93.1, 93.9; 307/66

(56) References Cited

U.S. PATENT DOCUMENTS

| | | | |
|---|---|---|---|
| 4,713,554 A | * 12/1987 | Henderson ................... 307/64 |
| 4,980,812 A | * 12/1990 | Johnson et al. ............... 363/44 |
| 5,103,388 A | * 4/1992 | Williams et al. .............. 363/69 |
| 5,982,648 A | * 11/1999 | Wang .......................... 363/70 |
| 6,163,469 A | * 12/2000 | Yuki ........................... 363/53 |
| 6,246,556 B1 | 6/2001 | Haun et al. ................... 361/42 |

* cited by examiner

*Primary Examiner*—Shawn Riley
(74) *Attorney, Agent, or Firm*—Larry I. Golden

(57) ABSTRACT

A wide input range power supply for a circuit protection and/or fault detector device includes a passive supply for providing power to a load under nominal input voltage conditions at or near the nominal line voltage with minimum power loss, and a linear regulating supply path for assisting the passive supply at an input line voltage substantially below the nominal line voltage value.

28 Claims, 1 Drawing Sheet

ULTRA-WIDE INPUT RANGE POWER SUPPLY FOR CIRCUIT PROTECTION DEVICES

FIELD OF THE INVENTION

This invention is directed generally to power supply technology and more particularly to an ultra-wide input range power supply for circuit protection devices.

BACKGROUND OF THE INVENTION

Power supply designs for small circuit and personnel protection/fault detection devices have operating constrains not common to most conventional line powered devices. More specifically, the supply must be designed such that 1) it operates under the extreme line voltage fluctuations typically seen during fault conditions, 2) efficiency is kept as high as possible to reduce the generation of excess heat, and 3) startup occurs fast enough to facilitate fault detection within the first line cycle after power is applied. The design discussed herein uses a novel combination of a linear and passive power converters to optimize the balance between efficiency, input voltage range, and fast start-up. A more detailed discussion of some of the problems solved follows:

Providing electronics with power throughout an extremely wide range of input voltage. A circuit performing fault detection in a circuit breaker must remain functional during the detection and tripping process. When a fault occurs, the input voltage to the power supply may fall to low levels. The power supply must continue, under those conditions, to supply the electronics with the energy required to detect the fault and open the circuit. Power supplies designed specifically for circuit breakers operate under the conditions present in load centers where large conductors provide AC power. However, as the need for "smart" detection of arcing and other types of faults expands to include protection at the outlet or load device, voltage drop under fault conditions increases due to the added series impedance of smaller wiring. The invention discussed herein features a wider input voltage operating range to meet these requirements.

Providing efficient power conversion. As the performance of "smart circuit protectors" such as arc detection circuits increases, so does the power requirement. Space constraints and heat generated from the circuit breaker itself leave little allowance for added heat dissipation from the electronics. In particular, the power supply must be efficient enough to do the required power conversion without dissipating excess heat. Previous designs for lower power circuits use a linear or passive approach. Excessive power is lost in these designs when they are scaled for higher output power. The invention uses an efficient power conversion method that combines both linear and passive power converters to meet these requirements.

Providing power to the electronics very quickly after power is applied. To allow fault detection within the first line cycle of applied power, the supply must start up within a fraction of a 50/60 Hz line cycle (2.78 mS for ⅙ cycle at 60 Hz). The invention accomplishes this even at low line voltages.

The power supply shown in Square D's U.S. Pat. No. 6,246,556 uses a passive power supply followed by a linear regulator (Ref FIG. 2 circuit block 60). In comparison, the invention discussed herein is an improvement on input voltage range, overall efficiency, and start-up time.

The invention is an improvement over previous designs that use single supply path. The improvement is an optimization of input voltage range, efficiency, and start-up time. Output regulation can be achieved over an extremely wide range of input voltages (10.1 or more) given properly selected components. Previous designs using a linear or passive approach have achieved a range of approximately 2:1. The extra wide range capability is made possible because the only constraints on input voltage are that 1) the peak input voltage does not exceed a value that would cause a violation of component ratings or power requirements, and 2) that the input voltage has an rms value that is a few volts above the regulated output voltage. Start-up time has also been improved over previous technologies by using the dual supply path approach.

OBJECTS OF THE INVENTION

Accordingly, it is a general object of the invention to provide an ultra-wide input range power supply for circuit protection devices.

SUMMARY OF THE INVENTION

Briefly, in accordance with the foregoing, a wide input range power supply for a circuit protection and/or fault detector device comprises a passive supply path comprising a passive supply for providing power to a load under nominal input voltage conditions at or near the nominal line voltage with minimum power loss, and a linear regulating supply path including a linear supply for supplying power to said load during start-up and at input line voltages below a first value and assisting in the passive supply at an input line voltage substantially below the nominal line voltage value.

In accordance with another aspect of the invention a method for supplying power over a wide range of input line voltages for a circuit protection device and/or fault detection device, comprises providing power to a load with minimum power loss using a passive supply path comprising a passive supply under nominal input voltage conditions at or near the nominal line voltage, providing power to said load at low input voltages below a first value using a linear regulating supply path including a linear supply, and assisting the passive supply using said linear regulating supply path at an input line voltage substantially below the nominal line voltage value and above said first value.

In accordance with another aspect of the invention a system for supplying power over a wide range of input line voltages for a circuit protection device and/or fault detection device, said method comprises passive supply means for providing power to a load with minimum power loss under nominal input voltage conditions at or near the nominal line voltage, and linear supply means for providing power to said load at low input voltages below a first value and for assisting the passive supply at an input line voltage substantially below the nominal line voltage value and above said first value.

In accordance with another aspect of the invention a linear/passive power converter, comprises a passive supply path comprising a passive supply for providing power to a load under nominal input voltage conditions at or near the nominal line voltage with minimum power loss, and a linear regulating supply path including a linear supply for supplying power to said load during strart-up and at input line voltages below a first value, and for assisting the passive supply at input line voltages substantially below the nominal line voltage value and above said first value.

DETAILED DESCRIPTION OF THE ILLUSTRATED EMBODIMENT

The invention concerns a power supply for efficiently converting AC line voltage to a low voltage DC level for use with a circuit protection or fault detection device, such as an arc fault detector. Due to constraints of the arc fault detector envisionment the invention uses the fewest components possible while generating as little excess heat as possible. The invention has been developed to operate in an industrial temperature range environment from a single phase, 120 Vac (49–132 Vac range), 50/60 Hz power source, however, the invention can also operate from a lower voltage DC source (24 V) using the same input terminals. The supply has been developed for a 4–6 Volt output at approximately 0.1 Watts but components can be scaled to increase or decrease output voltage and output power capability depending on the load requirements. The embodiment of the invention described below is particularly useful for arc-fault detecting circuit protectors.

Figure 1:
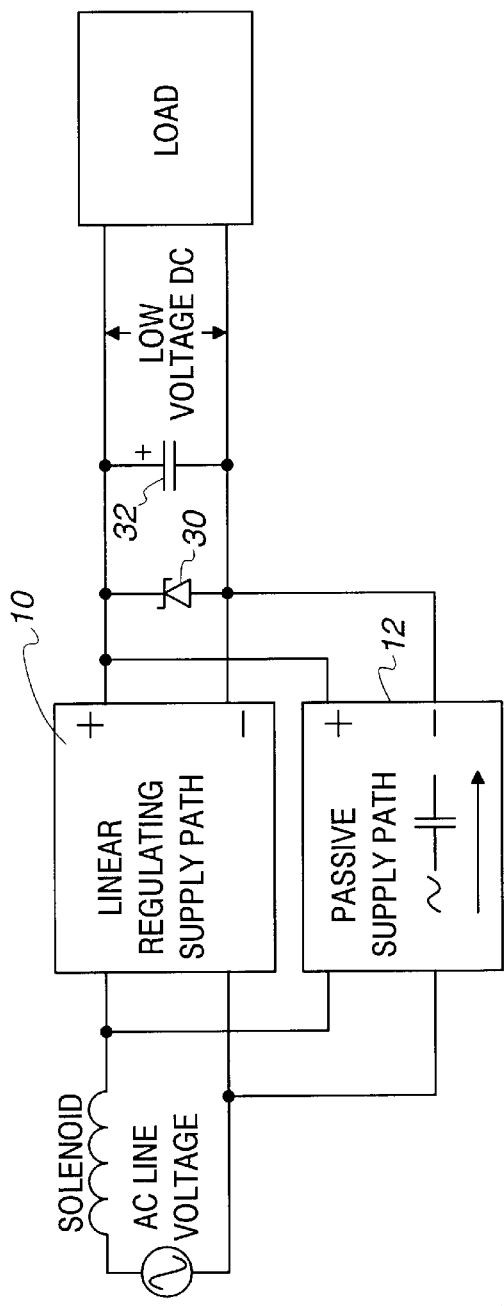
FIG. 1 is a block diagram of the power supply of the invention.

The invention uses a dual supply path design (see FIG. 1). By using both linear 10 and passive 12 power supply circuits working in conjunction with one another, the design of each can be optimized for efficient operation over complimentary ranges. The linear path 10 is designed to supply the load at low input voltages where it is operating most efficiently and provide fastest start-up when power is first applied. At high line voltages, the load is supplied through the passive, capacitor coupled, path 12 with minimal power loss. Both supply paths contribute some portion of the power between these extremes.

The invention can best be described as a combination linear/passive power converter (see FIG. 1). Power is supplied to the load through a passive, capacitor-fed path 12 under nominal and high line voltage conditions. The passive supply path 12 is assisted by a linear regulating circuit 10 that charges an output capacitor 32 quickly when power is first applied and prevents the supply output voltage from falling below minimum requirements under low-line voltage conditions. This approach allows the supply to operate as required over a wide range of input voltages while optimizing efficiency under nominal input voltage conditions. A more detailed description follows.

Figure 2:
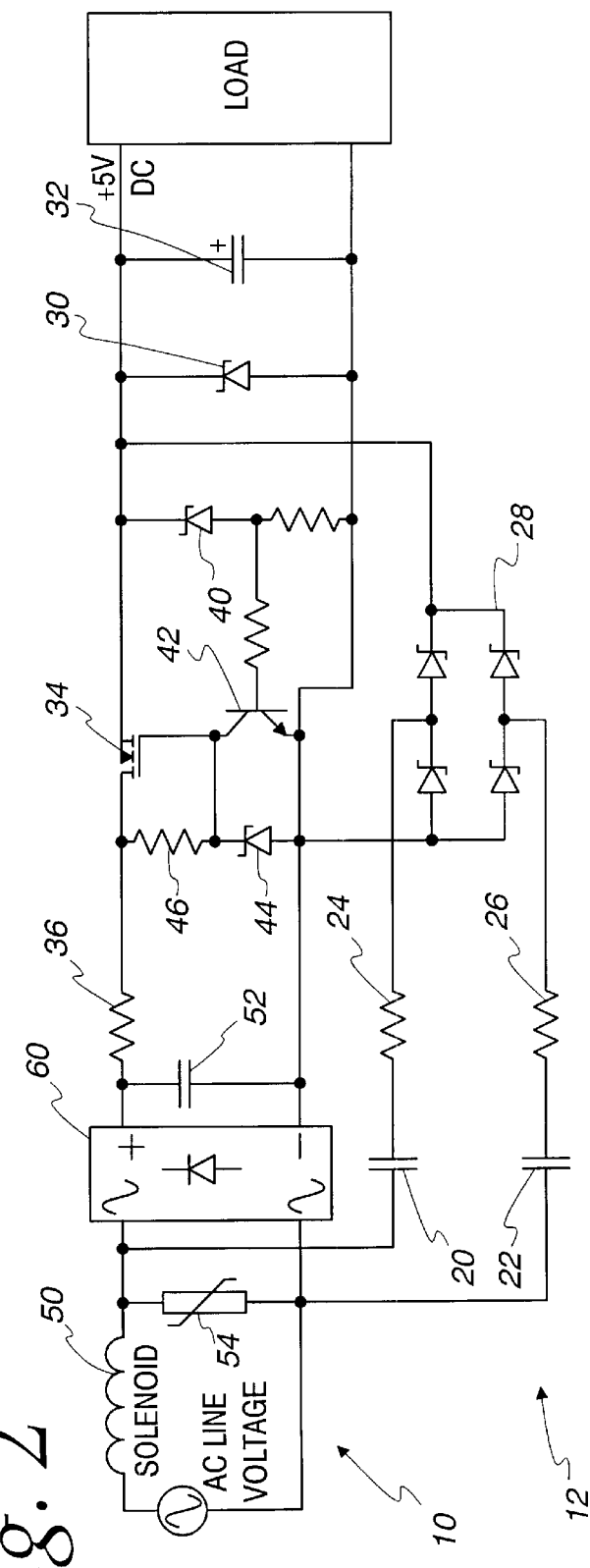
FIG. 2 is a circuit schematic showing one embodiment of a power supply in accordance with the invention.

FIG. 2 shows the details of the passive supply path circuitry 12. As noted above, the passive supply is designed to provide power to the load under nominal input voltage conditions. Capacitors 20 and 22 reduce the voltage reactively and therefore with little power loss. Resistors 24 and 26 serve for surge current limiting when the supply input is subject to a high frequency pulse. These resistor values are chosen such that little power is dissipated under normal operating conditions. Since the bridge rectifier 28 is on the low voltage side, low voltage diodes can be used. For input voltages above nominal, extra current delivered through the capacitors 20, 22 is shunted through an output clamp diode 30. Maximum input operating voltage is limited by the continuous power dissipation capability of the clamp diode 30 and the maximum allowable power dissipation requirements.

FIG. 2 also shows the details of the linear regulating supply path 10. The linear supply (voltage regulator) 10 is designed to assist the passive supply 12 when the input voltage drops below nominal. In this condition, the current available through the capacitors 20, 22 falls below .the load requirement and an output capacitor 32 begins to discharge. When the output voltage falls to a level just above the minimum required by the load, the linear supply is designed to supplement current to maintain the minimum voltage. Since the linear supply is only providing assistance to the passive supply, power dissipation in a pass transistor (MOSFET) 34 is kept to a minimum. Nearly all power is supplied through the linear side under very low input voltages where the power loss in the pass transistor 34 is acceptable. For quick startup, the pass transistor 34 is turned on to its maximum conductive state to allow charging of the output capacitor 32 through resistor 36.

The linear voltage regulator 10 operates by monitoring the voltage level at the output capacitor 32 and supplying current when needed. Under normal conditions, voltage at capacitor 32 is higher than the threshold of a zener diode 40. The resulting current supplied to the base of a transistor 42 causes a collector current high enough to pull the gate to source voltage on the MOSFET 34 below the minimum threshold. Under low line conditions capacitor 32 discharges to a minimum voltage where zener diode 40 ceases to conduct enough current to maintain the active state in transistor 42. The gate capacitance is then allowed to charge through resistor 46 to a point were the minimum output voltage is maintained. Resistor 36 limits start-up transient currents and zener diode 44 limits the maximum gate to source voltage applied to MOSFET 34.

Input filtering and surge limiting is performed by a solenoid coil 50, capacitor 52, and varistor (MOV) 54. The coil 50 may be a trip solenoid coil, which thus serves multiple purposes by providing input filtering, providing a means to open the circuit (trip) on a short circuit failure in the power supply, and providing an impedance bump for surge suppression. MOV 54 and capacitor 52 provide additional energy storage and suppression of high frequency transients. The incoming AC is rectified by bridge full wave rectifier component 60.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A wide input range power supply for a circuit protection and/or fault detector device, said power supply comprising:

a passive supply path comprising a passive supply for providing power to a load under nominal input line voltage conditions at or near the nominal line voltage with minimum power loss; and a linear regulating supply path including a linear supply for supplying power to said load during start-up and at input line voltages below a first value, and for assisting the passive supply at input line voltages substantially below the nominal line voltage value and above said first value.

2. The power supply of claim 1 wherein said passive supply comprises first circuit elements for reducing the supply voltage reactively, second circuit elements for eliminating surge current in response to high frequency pulses on the supply input, and a bridge rectifier.

3. The power supply of claim 1 wherein said linear regulating supply path comprises a circuit for monitoring the voltage level at an output capacitor; and a switching circuit, responsive to said circuit for montoring the voltage level, for supplying current.

4. The power supply of claim 3 wherein said circuit for monitoring the voltage level and supplying current comprises a zener diode and wherein said switching circuit comprises a power-supplying transistor and a first switching transistor for switching said power-supplying transistor into a conductive state for conducting current to said load.

5. The power supply of claim 1 and further including an input filtering and surge limiting circuit.

6. The power supply of claim 5 wherein said input filtering and surge limiting circuit comprises a solenoid coil and a varistor.

7. The power supply of claim 1 and further including an output capacitor and a clamp diode wired in parallel across the load.

8. The power supply of claim 2 wherein said linear regulating supply path comprises a circuit for monitoring the voltage level at an output capacitor and supplying current when needed; and a switching circuit, responsive to said circuit for montoring the voltage level, for supplying said current.

9. The power supply of claim 8 wherein said circuit for monitoring the voltage level and supplying current comprises a zener diode and wherein said switching circuit comprises a power-supplying transistor and a first switching transistor for switching said power-supplying transistor into a conductive state for conducting current to said load.

10. The power supply of claim 9 and further including an input filtering and surge limiting circuit.

11. The power supply of claim 10 wherein said input filtering and surge limiting circuit comprises a solenoid coil and a varistor.

12. The power supply of claim 11 and further including an output capacitor and a clamp diode wired in parallel across the load.

13. A method for supplying power over a wide range of input line voltages for a circuit protection device and/or fault detection device, said method comprising:
    providing power to a load with minimum power loss using a passive supply path comprising a passive supply under nominal input voltage conditions at or near the nominal line voltage;
    providing power to said load at low input voltages below a first value using a linear regulating supply path including a linear supply; and
    assisting the passive supply using said linear regulating supply path at an input line voltage substantially below the nominal line voltage value and above said first value.

14. The method of claim 13 wherein said providing power under nominal input conditions comprises reducing the supply voltage reactively, eliminating surge current in response to high frequency pulses on the supply input, and rectifying an AC input.

15. The method of claim 13 wherein said providing power at low input voltages and said assisting comprises monitoring the voltage level at an output capacitor and supplying current when needed and in response to said circuit for montoring the voltage level.

16. The method of claim 15 wherein said monitoring the voltage level uses a zener diode and wherein said supplying current comprises switching a power supplying transistor into a conductive state for conducting current to said load.

17. The method of claim 13 and further including input filtering and surge limiting.

18. The method of claim 14 wherein said providing power at low input voltages and said assisting comprises monitoring the voltage level at an output capacitor and supplying current when needed in response to said circuit for montoring the voltage level.

19. The method of claim 18 wherein said monitoring the voltage level uses a zener diode and wherein said supplying current comprises switching a power supplying transistor into a conductive state for conducting current to said load.

20. The method of claim 19 and further including input filtering and surge limiting.

21. A system for supplying power over a wide range of input line voltages for a circuit protection device and/or fault detection device, said system comprising:
    passive supply means for providing power to a load with minimum power loss under nominal input voltage conditions at or near the nominal line voltage; and
    linear supply means for providing power to said load at low input voltages below a first value and for assisting the passive supply at an input line voltage substantially below the nominal line voltage value and above said first value.

22. The system of claim 21 wherein said passive supply means comprises means for reducing the supply voltage reactively, means for eliminating surge current in response to high frequency pulses on the supply input, and means for rectifying an AC input.

23. The system of claim 21 wherein said linear supply means comprises means for monitoring the voltage level at an output capacitor and means for supplying said current in response to said means for montoring the voltage level.

24. The system of claim 23 wherein said means for monitoring the voltage level includes a zener diode and wherein said means for supplying current comprises means for switching a power supplying transistor into a conductive state for conducting current to said load.

25. The system of claim 21 and further including input means for filtering and surge limiting.

26. The system of claim 22 wherein said linear supply means comprises means for monitoring the voltage level at an output capacitor and means for supplying current in response to said means for montoring the voltage level.

27. The system of claim 26 wherein said means for monitoring the voltage level includes a zener diode and wherein said means for supplying current comprises means for switching a power supplying transistor into a conductive state for conducting current to said load.

28. A linear/passive power converter, comprising:
    a passive supply path comprising a passive supply for providing power to a load under nominal input voltage conditions at or near the nominal line voltage with minimum power loss; and
    a linear regulating supply path including a linear supply for supplying power to said load during start-up and at input line voltages below a first value, and for assisting the passive supply at input line voltages substantially below the nominal line voltage value and above said first value.

* * * * *